United States Patent
Bui-Tran et al.

(10) Patent No.: US 6,253,156 B1
(45) Date of Patent: Jun. 26, 2001

(54) SYNCHRONIZED SEISMIC SIGNAL ACQUISITION METHOD AND DEVICE

(75) Inventors: Van Bui-Tran, Coachères; Thi Thu Nguyen, Paul Signac; Gérard Thierry, Blanche, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/460,514

(22) Filed: Dec. 14, 1999

(30) Foreign Application Priority Data

Dec. 14, 1998 (FR) .................................................. 98 15792

(51) Int. Cl.[7] .................................................. G01V 1/28
(52) U.S. Cl. .................................................. 702/17
(58) Field of Search ............................... 702/14, 17, 18; 367/45

(56) References Cited

U.S. PATENT DOCUMENTS 4,748,578   5/1988   Lagadec et al. ..................... 364/724

FOREIGN PATENT DOCUMENTS 0741472   11/1996   (EP) ................................ H04L/7/02

OTHER PUBLICATIONS

Laakso, T. I., et al, "Splitting the Unit Delay", IEEE Transactions on Signal Processing, vol. 13, No. 1, Jan. 1, 1996, pp. 30–60, XP002050526, ISSN: 1053–587X.

Primary Examiner—Donald E. McElheny, Jr.
(74) Attorney, Agent, or Firm—Antonelli, Terry, Stout & Kraus, LLP

(57) ABSTRACT

Method and device intended for synchronized acquisition of seismic signals by one or more acquisition units suited for seismic signal digitizing, allowing to obtain, for each signal, a series y[n] of samples of these signals readjusted from a reference time on, from a first series x[n] of digitized samples of this seismic signal produced from any initial time prior to the reference time. The method essentially comprises detecting a synchronization signal indicative of this reference time ($T_R$), measuring the effective time difference (D) between the reference time and the initial time, determining coefficients of a digital filter (F) suited to compensate for the fractional part (d) of the measured effective time difference, and applying this compensation digital filter to the first series of samples, which allows to obtain a series of digitized samples readjusted from the reference time. In order to accelerate determination of the filter coefficients depending on the difference D observed, the coefficients of a certain number of intermediate filters corresponding to determined fractions of the sampling interval are preferably precalculated. The method can be applied for seismic prospecting or monitoring, earthquake detection, etc.

29 Claims, 5 Drawing Sheets

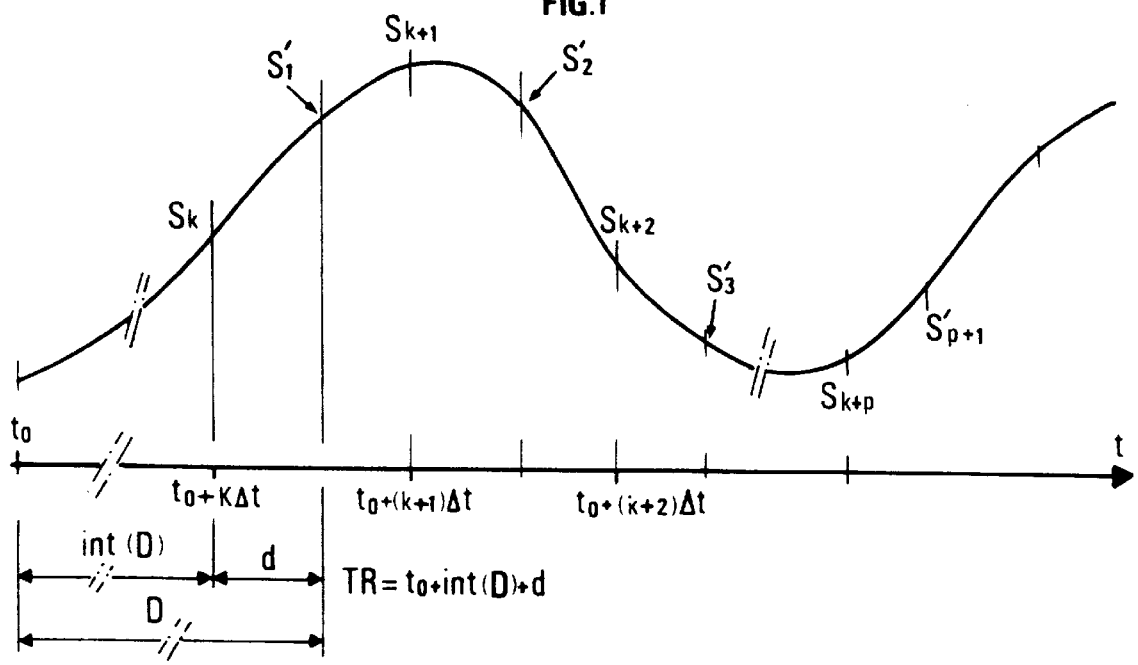
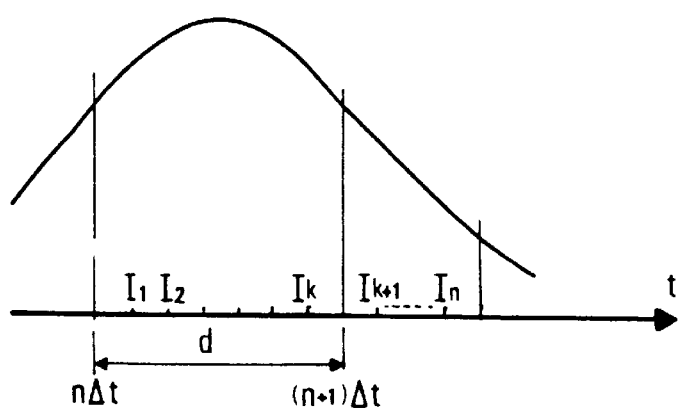

FIG.6

| Filter order | Fractional delay | Error made |
|---|---|---|
| 35 | 0.5 | $1.5*10^{-5}$ |
| 40 | 0.5 | $1.7*10^{-5}$ |
| 42 | 0.5 | $1*10^{-5}$ |
| 43 | 0.5 | $6.2*10^{-5}$ |
| 44 | 0.5 | $3.1*10^{-5}$ |
| 45 | 0.1 | $3.25*10^{-7}$ |
| 45 | 0.2 | $6.1*10^{-7}$ |
| 45 | 0.3 | $9*10^{-7}$ |
| 45 | 0.4 | $1*10^{-6}$ |
| 45 | 0.5 | $1.3*10^{-6}$ |
| 50 | 0.1 | $4.2*10^{-6}$ |
| 50 | 0.2 | $8*10^{-6}$ |
| 50 | 0.3 | $1.2*10^{-6}$ |
| 50 | 0.4 | $1.4*10^{-6}$ |
| 50 | 0.5 | $1.45*10^{-6}$ |
| 60 | 0.1 | $4*10^{-8}$ |
| 60 | 0.2 | $7*10^{-8}$ |
| 60 | 0.3 | $1*10^{-7}$ |
| 60 | 0.4 | $1.2*10^{-7}$ |
| 60 | 0.5 | $1.25*10^{-7}$ |
| 60 | 0.6 | $1.25*10^{-7}$ |
| 60 | 0.7 | $1*10^{-7}$ |
| 60 | 0.8 | $7*10^{-8}$ |
| 60 | 0.9 | $4*10^{-8}$ |
| 80 | 0.1 | $8*10^{-10}$ |

FIG.7

| Interpolation type (order of the interpolation polynomial) | Difference between two successive precalculated delays | Order of the max. time error made |
|---|---|---|
| Linear | 0.01 | $2*10^{-5}$ |
| | 0.005 | $1.2*10^{-5}$ |
| | 0.001 | $2*10^{-7}$ |
| | 0.0001 | $3.1*10^{-9}$ |
| Of the 2$^{nd}$ order | 0.05 | $1.25*10^{-5}$ |
| | 0.025 | $2*10^{-6}$ |
| | 0.02 | $8*10^{-7}$ |
| | 0.001 | $2*10^{-8}$ |
| Of the 3$^{rd}$ order | 0.025 | $5*10^{-8}$ |
| | 0.05 | $10^{-6}$ |
| Of the 4$^{th}$ order | 0.05 | $2*10^{-8}$ |
| | 0.1 | $10^{-6}$ |
| Of the 5$^{th}$ order | 0.1 | $2*10^{-8}$ |

SYNCHRONIZED SEISMIC SIGNAL ACQUISITION METHOD AND DEVICE

FIELD OF THE INVENTION

The present invention relates to a synchronized seismic signal acquisition method allowing resynchronization of seismic signal acquisition on an exterior event, and to a device for implementing it.

The method according to the invention finds applications in many fields where various measured signals are to be sampled for example, by means of different acquisition chains, by imposing that the series of samples taken are substantially synchronous with an exterior event. This is notably the case in the field of seismic exploration where an initial time from which significant seismic signals are recorded is to be fixed for an acquisition system.

The initial reference time generally selected is the time of triggering of a source of seismic waves. The waves emitted are propagated in the subsoil and received by seismic pickups distributed at the ground surface for example. The signals delivered by these pickups are transmitted to a central control and recording station, generally by means of acquisition devices distributed in the field. Each one of them is suited to amplify, filter, digitize and store all the signals picked up after each source triggering. The stored data are transmitted to a central station from each acquisition device at fixed time intervals (after each emission-reception cycle for example) or "with the stream", as soon as a transmission time interval is available. Seismic acquisition systems are for example described in patents FR-2,511,772 (U.S. Pat. No. -4,583,206) or FR-2,538,194 (U.S. Pat. No. -4,628,494).

In each acquisition device, the seismic signals are applied to an acquisition chain. A conventional acquisition chain structure comprises a steady-gain preamplifier, a high-pass filter, an anti-aliasing low-pass filter and an analog-to-digital (ADC) converter. The converters deliver for example 24-bit numerical words. They are for example (sigma-delta type) oversampling analog-to-digital converters associated with digital filters (FIR).

Oversampling converters produce numerical words of reduced format in relation to conventional converters, but with a much higher frequency. The normal dynamic range is restored by applying to the signals coming from the converter a digital filter referred to as decimation filter which, besides its anti-aliasing filtering functions, is suited to stack a determined number of samples with appropriate weightings as it is well-known to specialists.

An analog-to-digital converter digitizes series of analog samples taken from a signal at times fixed by an internal clock. This is no drawback when the converter works in isolation. It becomes a drawback in all the cases where it is desired to precisely fix an initial reference time in relation to which a sequence of events is located, and especially when signal acquisitions are to be carried out by a series of different converters.

In seismic prospecting operations notably, the seismic waves coming from the subsoil as a result of an emission by a source of seismic waves are picked up by a multiplicity of receivers and converted to digitized samples by an often considerable number of different acquisition chains provided each with an analog-to-digital converter. A reference time is selected, generally the time of triggering of the seismic source, and one tries to adjust in relation to this time the first significant sample taken by the various converters on each signal picked up by the receivers. If the sampling time of each converter only depends on an internal clock, there is no reason to be synchronized with the exterior event selected as the reference. A certain random delay or jitter follows therefrom, which is generally different from one acquisition chain to the next. The consequence thereof is a lack of synchronization that is very disturbing when signals received and acquired by different acquisition chains have to be combined, as it is generally the case in conventional seismic processing.

BACKGROUND OF THE INVENTION

Patent FR-2,666,946 (U.S. Pat. No. 5,245,647) filed by the applicant discloses a signal sampling device comprising in combination a sigma-delta type oversampling converter associated with a FIR type digital filter performing decimation of successive series of oversamples and a device for synchronizing the samples delivered with an exterior event such as the time of triggering of a seismic source for example. The solution used in this prior device essentially consists in a memory inserted between the sigma-delta converter and the decimation filter, wherein a series of oversamples is permanently stored. On reception of an exterior reference signal, the device is suited to find in the inserted memory the oversamples formed before reception of this signal and to command transfer thereof in the decimation filter so as to produce the first of the resynchronized samples.

Although this solution is perfectly operational, it has the drawback of requiring complex and expensive electronic components inserted between the delta-sigma modulator and the FIR anti-aliasing filter, i.e. a memory and relatively complex means for managing it.

There are also well-known fractional (less than one unit) delay processing techniques notably described by: Laakso T. I. et al : Splitting the Unit Delay; in IEEE Signal Processing Magazine; 1996, allowing to carry out, by means of calculations, time readjustment of the signal sampling. Certain principles thereof, useful for better understanding of the method, are reminded hereafter.

$x[n]$ denotes a series of digitized samples $S_k$, $S_{k+1}$, $S_{k+2}$ ... $S_{k+p}$, etc, taken (FIG. 1) from a measuring signal from an initial time $t_0$ on, with a sampling interval $\Delta t$, by an analog-to-digital converter, and $y[n]$ denotes a series of samples $S'_1$, $S'_2$, $S'_3$ ... $S'_{p+1}$, etc, taken with the same interval from the same measuring signal but readjusted in time from a reference time $T_R$ after $t_0$. The readjustment time difference D is a positive real number.

This number can generally be written as follows: D=int (D)+d, where int(D) corresponds to a whole number of sampling periods and d is a fraction of a period.

We must have: $y[n]=x[n-D]$.

In order to obtain a delay int(D), it is sufficient to delay the initial signal $x[n]$ by a simple translation. The samples of $y[n]$ are those of $x[n]$ whose index is simply delayed (renumbered) by int(D). The sample bearing number k in the first series for example becomes the sample bearing number 1 in the second series, with $k.\Delta t=\text{int}(D)$. For the fractional part of this time difference, the readjusted samples $y[n]$ will be somewhere between the values of $x[n]$ at two successive sampling positions by the local clock and they must best correspond to the effective amplitudes of the sampled signals at these intermediate positions. This delay with readjustment can be obtained by applying a digital filtering F (FIG. 2).

With the notations specific to the z transform, this delay by digital filtering can be expressed as follows:

$$Y(z)=X(z).z^{-D}.$$

The frequency response of the ideal filter $H_{ID}$ is:

$$H_{id} = z^{-D} = e^{-j\omega D}$$

with $$z = e^{j\omega}.$$

The amplitude and phase responses of the ideal filter for any ω are therefore:

$$|H_{id}(e^{j\omega})| = 1$$

and $$\arg[H_{id}(e^{j\omega})] = \theta_{id}(\omega) = -D\omega.$$

The phase is often represented as a phase lag defined by:

$$\tau_p(\omega) = -\frac{\theta_{id}(\omega)}{\omega},$$

a lag that is here D.

The corresponding impulse response is obtained by inverse Fourier transform:

$$h_{id}[n] = \frac{1}{2\pi} \int_{-\pi}^{\pi} H_{id}(e^{j\omega}) e^{j\omega n \Delta t} d\omega$$

for any n, hence:

$$h_{id}[n] = \frac{\sin[\pi(n\Delta t - D)]}{\pi(n\Delta t - D)} = \mathrm{sinc}(n\Delta t - D)$$

for any n.

This ideal filter cannot be implemented because its impulse response is infinitely long. There are however several methods allowing to approximate to this ideal solution close enough for the readjustment precision to remain compatible with the precision expected in practice. Selection of the method to be used depends on the specific criteria to be observed within the scope of the application.

The filtering method to be implemented must correspond to certain requirements linked with the means used:passband of the signals to be acquired, sampling frequency, technical limitations of the available digital filtering application means (calculation means) and expected precision of the readjusted sample calculation.

Within the scope of an application to seismic data acquisition for example, it is imposed that the passband of the filter is compatible with all the useful signals carrying seismic information and therefore contains for example the [0 Hz, 375 Hz] frequency interval, as well as a 1000 Hz sampling frequency for the seismic signals. Real-time sample readjustment can be imposed if the acquisition units comprise powerful DSP type signal processors for example, as described in the aforementioned patents, which also contributes to facilitating implementation of digital filtering.

SUMMARY OF THE INVENTION

The synchronized seismic signal acquisition method according to the invention allows to obtain a series of digitized samples of each signal readjusted in time from at least one reference time on, from a first series of digitized samples of these seismic signals produced from any initial time prior to the reference time, by an acquisition unit, with a definite sampling interval.

It is characterized in that it comprises:
  detecting a synchronization signal indicative of this reference time (produced in response to the detection of an event),
  measuring the effective time difference (D) between the reference time and the initial time,
  determining coefficients of a digital filter suited to compensate for the measured effective time difference, the coefficients being sufficient in number to obtain a fixed time compensation precision, and
  applying to the first series of samples the digital compensation filter, which allows to obtain a series of digitized samples readjusted from the reference time.

Calculation of the fractional filter coefficients advantageously comprises direct determination of the ripple margins of the amplitude and of the phase respectively according to the maximum time error ($E_M$) affecting the signal delayed by the fractional filter, which allows the coefficients of this filter to be calculated.

According to a preferred embodiment,
  a) the values of the coefficients of N intermediate digital filters suited to compensate for N time difference values spread over the duration of the seismic signal sampling interval by the converter are first determined, then these filtering coefficients are stored,
  b) the coefficients of the fractional-delay digital filter suited to compensate for the measured effective time difference are calculated by interpolation (Lagrange type interpolation for example) between the coefficients of the series of filtering coefficients associated with the closest difference values, and
  c) the fractional compensation filter is applied to the first series of samples.

The synchronization signal is generated for example upon detection of a seismic signal which can be the first-break wave emitted when a seismic source (impulsive source or vibrator(s)) is triggered, or upon identification (by correlation) with a known signature or upon detection of a certain seismic energy level, in the case where it is used for detecting an earthquake or a nuclear explosion, etc.

The method according to the invention can be used notably in a device intended for synchronized acquisition of seismic signals picked up by seismic receivers in response to an emission of elastic waves in the ground at reference times by one or more seismic sources, these receivers being in contact with the ground and connected to at least one seismic acquisition unit at a distance from a control station. It comprises acquisition, with a definite sampling interval, of at least one series of digitized samples of these seismic signals by an analog-to-digital converter in each acquisition unit from an initial time prior to the reference time, detection by each acquisition unit of a synchronization signal indicative of the reference time, measurement of the effective time difference between the initial time and the reference time (possibly taking account of the time of propagation of each synchronization signal to each acquisition unit), determination of the coefficients of a fractional digital filter suited to compensate for the measured effective time difference, the coefficients being sufficient in number to obtain a fixed compensation precision, and application of the compensation filter to the first series of samples, allowing to form a series of digitized samples readjusted from said reference time.

According to an embodiment applicable to seismic prospecting operations wherein elastic waves are emitted by several vibrators, the method comprises detection, by each acquisition unit, of synchronization signals emitted in response to the emission of waves by each vibrator and measurement of the corresponding effective time differences, determination of the coefficients of the various fractional digital filters suited to compensate for the various measured effective time differences, the coefficients being sufficient in number to obtain a fixed compensation precision, and application of the various compensation filters allowing to form series of digitized samples readjusted from the corresponding reference time.

The digitizing method as defined above is advantageous on several accounts.

It can be implemented from analog-to-digital converters of a standard type, non-modified and therefore readily available, in cooperation with a precise measuring means that is possibly included in the processing unit. Since digital filtering is carried out by software means, the method is flexible and readily adaptable to any type of application.

Narrowing the interval between whose intermediate boundaries interpolation is performed in order to find the exact coefficients of the suitable digital filter, in cases where the coefficients of the digital filters applicable to several well-defined fractions of the sampling interval are precalculated, considerably reduces the calculation time.

The method of readjusting series of samples according to the invention allows to let the (or each) converter "run" permanently and to form the series of samples readjusted from the reference time as soon as delay D is known.

The synchronization signal that can be used is no longer only the triggering signal (TB) but, as we have seen above, the first-break wave, the time of recognition of an acoustic signature or of detection of an energy threshold, etc.

In the case where several vibrators vibrating more or less in synchronism are used, with continuous seismic acquisition, it is necessary, in order to process the signals received (to correlate them with the signals emitted), to delay the reference time selected for readjustment to the beginning of the corresponding vibration, and in this respect the method according to the invention is particularly flexible.

The synchronized seismic signal acquisition device according to the invention allows to obtain, from each seismic signal, at least one series of digitized samples readjusted from at least one reference time on, from a first series of digitized samples taken from this seismic signal, produced from any initial time prior to the reference time.

It comprises at least one signal acquisition unit including at least one analog-to-digital converter producing this first series of samples, and it is characterized in that it comprises, in each acquisition unit, a means for detecting a synchronization signal, a processing unit associated with means for storing series of samples produced by said converter, a metering means for measuring the effective time interval elapsed between the initial time and the reference time, the processing unit being programmed to determine coefficients of a digital filter suited to compensate for the measured effective time difference (consisting of a whole part and of a fractional part) and to apply, to the first series of samples, the digital fractional compensation filter.

The device is advantageously used in a seismic signal acquisition system where each acquisition unit comprises means allowing data exchange, by means of a transmission channel, with a distant station provided with means for emitting the synchronization signal in response to detection of an event, and a control system including the processing unit, suited to process the seismic data before they are transmitted to the central station. The processing unit is then programmed to determine coefficients of a fractional digital filter suited to compensate for the effective time difference measured by the metering means, by taking account of the time of propagation of the synchronization signal on the transmission channel connecting each acquisition unit to the central station.

According to a preferred embodiment, the device comprises means for storing coefficients of N intermediate digital filters suited to compensate for N time difference values spread over the duration of the seismic signal sampling interval by the converter, and the processing unit is suited to calculate the coefficients of the digital filter suited to compensate for the measured effective time difference, by interpolation between the series of filtering coefficients associated with the closest difference values, and to apply the compensation filter to the first series of samples.

According to an embodiment suited for seismic prospecting operations using vibrators as emission means, the device comprises metering means, in each acquisition unit, for detecting synchronization signals emitted in response to the emission of waves by each vibrator, and for measuring each effective time difference, the processing unit comprising means for determining the coefficients of the various fractional digital filters suited to compensate for the various measured effective time differences, and means for applying the various compensation filters allowing to form series of digitized samples readjusted from said reference time.

BRIEF DESCRIPTION OF THE DRAWINGS

Other features of the method and of the device according to the invention will be clear from reading the description hereafter of a non limitative realisation example, with reference to the accompanying drawings wherein:

FIG. 1 illustrates readjustment of a series of samples,

FIG. 2 illustrates the application of digital filtering F allowing readjustment of samples, FIG. 3 illustrates the principle of use of intermediate filters allowing to accelerate calculation of the digital filters, FIG. 4 diagrammatically shows a seismic data acquisition and transmission system, FIG. 5 diagrammatically shows the organization of a local acquisition box, FIG. 6 is a chart showing the residual difference between the sampled initial signal and the signal defined by the recalculated samples, according to the number of coefficients of the filter and to the value of the delay expressed as a fraction of the sampling interval, and FIG. 7 is a chart showing the precision obtained according to the number of precalculated intermediate results and to the order of the interpolation polynomial.

DETAILED DESCRIPTION OF THE INVENTION

Figure 4:
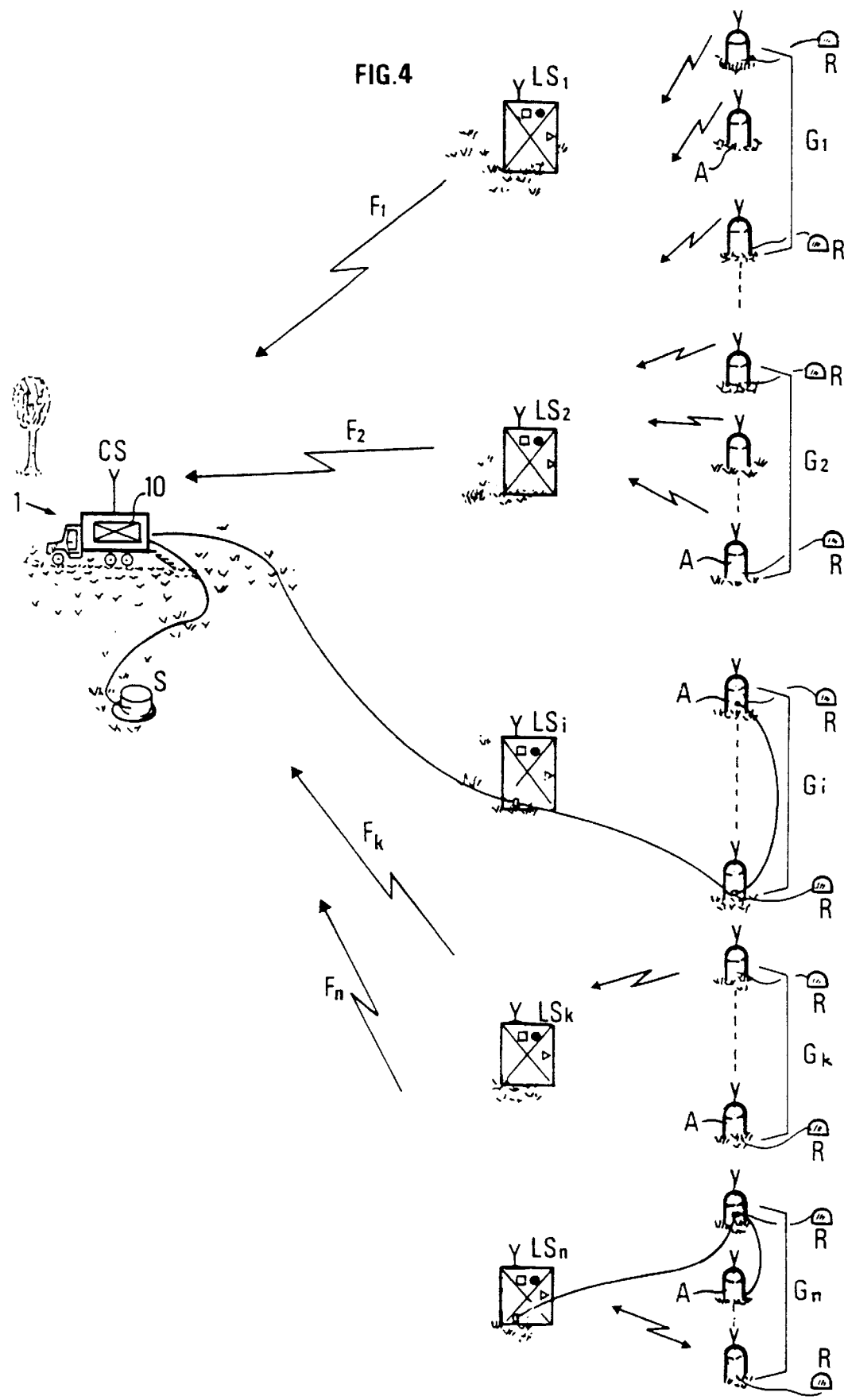

An important point of the method is that it has been possible to establish that, if $\Delta D$ and $a$ are respectively the ripple margins within the passband concerning the phase and the amplitude respectively, the maximum time error $E_M$ point by point between the delayed signal calculated by the filter and the ideal delayed signal (for which $E_M=0$) can be expressed by the relation:

$$E_M \approx \sqrt{[(\Delta D)^2 + (\alpha)^2]} \quad (1)$$

provided that the signal is in the frequency band below the filter cutoff frequency.

Knowing this relation between the maximum error and the filtering characteristics, a known FIR (Finite Impulse Response) filter design method is selected, that gives the coefficients of the appropriate filter.

When an analog-to-digital converter running on 24 bits, including a sign bit, is used for example, one can impose that the error is at most equal to one quantification interval, i.e. $2^{-23} \approx 10^{-7}$.

For a $10^{-7}$ error, a has to be of the order of $10^{-7}$, which requires a ripple margin $|H|$ of the filtering function such that: $1-a \leq |H| \leq 1+a$. Since a is very small, it can be easily shown that this inequality is equivalent to: $-10^{-6} \leq |H|_{dB} \leq 10^{-6}$. The same relation (1) shows that $|\Delta D|$ must also be of the order of $10^{-7}$.

With the specifications given above, suitable for seismic prospecting applications:
- cutoff frequency characterized by two values, 375 Hz and 420 Hz,
- oscillations in the [0, 375 Hz] frequency band below 0.05 dB,
- oscillations in the [0, 420 Hz] frequency band below 0.2 dB,
- phase cutoff frequency of 375 Hz,
- oscillations in the [0, 375 Hz] frequency band below a delay corresponding to a time delay of 4 $\mu$s, the phase specification corresponding to 4 $\mu$s for a sampling frequency of 1000 Hz (therefore a time period $T_e=10^{-3}$ s=1 ms) gives a fractional delay:

$$\Delta D = \frac{\Delta t}{T_e} = \frac{4\mu s}{1\,ms} = 4.10^{-3}.$$

These amplitude and phase constraints are thus greatly fulfilled if an error below $10^{-7}$ is imposed.

The value of the filter coefficients then has to be determined, considering the imposed limitations, by selecting, as mentioned above, a method from the filter design methods known to specialists. The Lagrange interpolation method can be used, which provides very good frequency response and very flat amplitude response for the low frequencies, but the resulting filter has a very narrow passband that does not vary much with the order of the filter. There are also well-known time windowing methods (Kaiser window, Dolph-Tchebichev window, Blackman window, Hamming window, etc). Another known method, referred to as least-squares method, essentially consists in minimizing the frequency error between the ideal filter and the FIR filter used. The computing programmes required for calculation of the filtering coefficients according to these various methods are most often available from known signal processing software libraries such as Matlab™ for example.

For each particular delay value, a resampling allowing approximation with a precision of the order of $10^{-7}$ requires calculation of a filter defined by several ten filtering coefficients. 60 are for example required with the generalized least-squares method to reach a precision of this order as shown in the table of FIG. 6.

The time required fo such a calculation depends of course on the available computing means or resources. There are cases where, because of the conditions imposed: relatively wide passband of the signals to be acquired and/or performance of the available computing means, the desired readjustment of the sampled signals to a reference time cannot be performed in real time.

A solution consists in this case in precalculating the filtering coefficients for well-defined fractions of the period or sampling interval $\Delta t$. Interval $\Delta t$ being subdivided by N points $I_1, I_2, \ldots I_k, I_N$ (FIG. 3) into N+1 parts (N being 10 for example), N precalculated filters $F_1$ to $F_N$ are thus defined. The various series of coefficients are then stored in memories of the computing unit, before the acquisition operations start. During operation, the time subinterval (between $I_k$ and $I_{k+1}$ in the figure) in which the fractional time difference d between the initial sampling time and the reference time lies is determined, and interpolation is performed between the stored corresponding series of coefficients so as to calculate the coefficient of the required readjustment filter. The closer approximation to fractional delay d allowed by these previous calculations considerably reduces the time required for calculation of the appropriate digital filter. A precision of the order of $10^{-7}$ can for example be reached with 10 series of precalculated intermediate coefficients for an interpolation of the $5^{th}$ order and with 20 series of intermediate coefficients for an interpolation of the $4^{th}$ order, as shown in the table of FIG. 7.

The method described can be implemented in a seismic acquisition system as described in the aforementioned patents, notably in patents FR-A-2,720,518; EP-A-594,477 or in patent application FR-97/09,547, suited to acquire the signals picked up by seismic receivers R (FIG. 4) distributed over a zone to be explored, according to a layout suited for the 2D or 3D type prospection to be performed, these receivers R picking up the seismic waves reflected by underground discontinuities, and to transmit them to a distant station CS such as a central control and recording station where all the seismic signals collected are eventually centralized, either directly or by means of intermediate stations LS fulfilling more or less complex functions:concentration, organization and sequencing of the exchanges between acquisition units A and central station CS.

Source S can be impulsive (an explosive charge for example, or an air gun) or consist of one or more vibrators. This source can be coupled with the formations of the zone to be explored and connected by radio link or control cable to central station CS or, in the case of coastal zone exploration, possibly towed, while immersed, by a shooting boat connected to central station CS by radio link.

Figure 5:
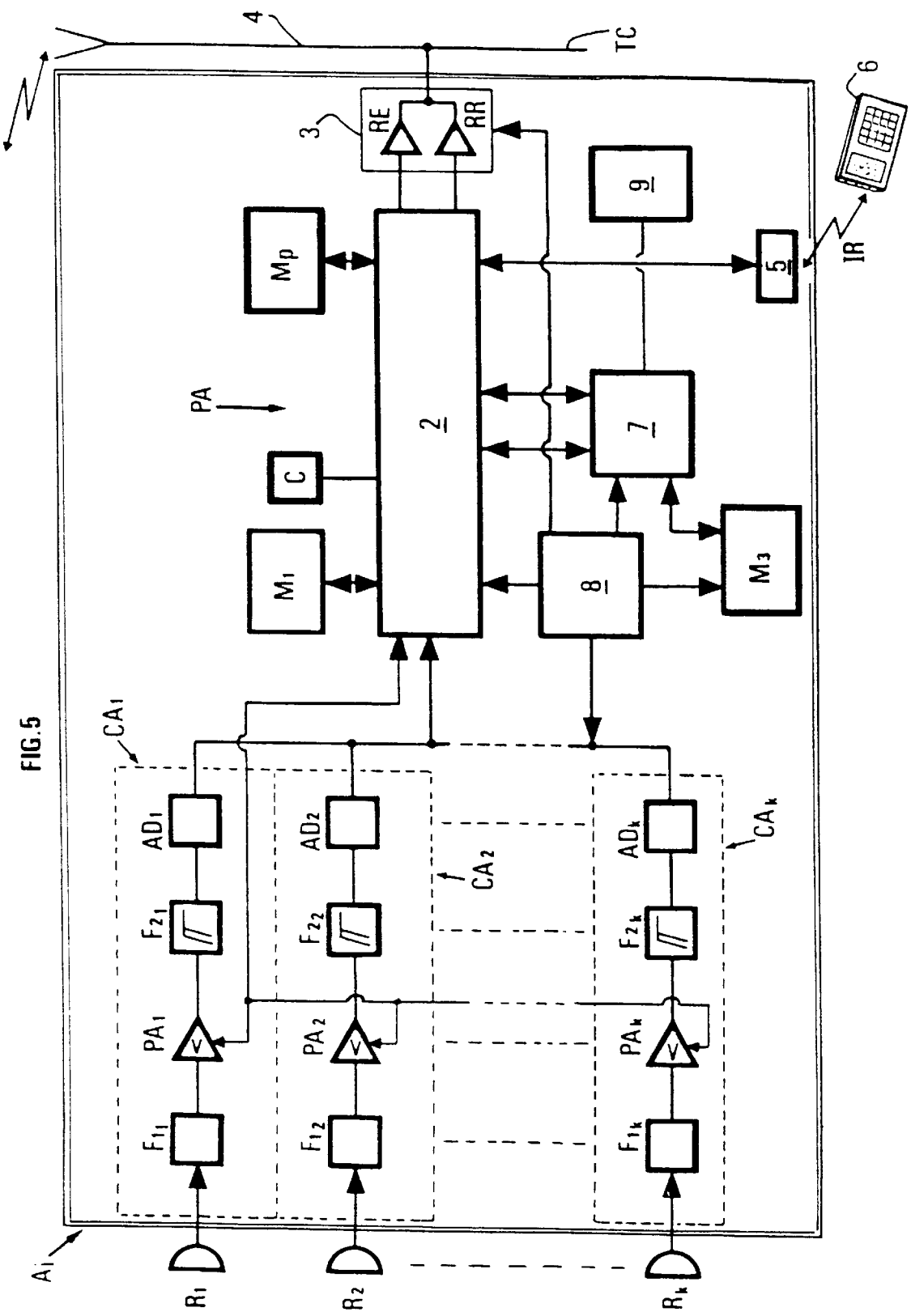

Each acquisition box is suited (FIG. 5) for acquisition of a number k (k$\geq$1)) of seismic receivers $R_1, R_2, \ldots R_k$, providing each a seismic "trace". It therefore comprises for example k acquisition chains $CA_1$, to $CA_k$ receiving respectively the k signals and comprising each, for example, a low-pass filter $F_{11}, F_{12}, \ldots F_k$, a preamplifier $PA_1, PA_2, \ldots PA_k$, a high-pass filter $F_{21}, F_{22}, \ldots F_{2k}$, and an analog-to-digital (ADC) converter $AD_1, AD_2, \ldots AD_k$ for converting the amplified and filtered analog signals to 24-bit numerical words for example. The converters are for example oversampling sigma-delta type converters. All the acquisition chains are connected to a microprocessor 2 processing 16 to 32-bit numerical words for example, programmed to manage acquisition and exchanges with the distant station (not shown). A working memory $M_1$ and a memory Mp for the programmes are associated with microprocessor 2. Processor 2 is connected to an emission-reception unit 3 suited to the transmission channel used for communication with the distant station. If it is a Hertzian channel, unit 3 comprises a radio transmitter RE and a radio receiver RR that communicate with an antenna 4. An interface unit 5 described in patent FR-A-2,608,780 mentioned above also allows infrared communication with an initialization box 6 by means of which an operator can possibly transmit to management processor 2 addressing and selection instructions concerning the working parameters of the acquisition chains.

Each acquisition box Ai also preferably comprises a processor 7 specialized in signal processing, such as for example a DSP 96002 type floating point 32-bit processor, that is associated with a DMA type device for accelerating data block transfers between the two processors 2 and 7. A working memory $M_3$ is associated with the latter processor. Each acquisition box also comprises a self-contained power supply unit 8.

The function of general processor 2 is to perform decoding of the orders transmitted by the distant station and to manage acquisition of the signals of receivers $R_1$ to $R_k$ by the various acquisition chains, transmissions in connection with transmission unit 3, memory $M_1$ for temporary data storage, inputs/outputs, interrupts between programmes, exchanges with DSP computing processor 7, etc.

DSP computing processor 7 is particularly well-suited for high-speed operations such as format conversions, complex number multiplications, FFT type Fourier transforms, correlations between received signals and emitted signals, digital filtering, successive shot stacking with suppression of disturbance noises of non-seismic nature, combination of the signals delivered by multi-axis seismic receivers such as three-axis geophones for example, etc. Preprocessing performed locally prior to transmission contributes to appreciably reducing the number of tasks set to the distant station.

Each acquisition box can also comprise a flash-type high-capacity storage memory 9 for example, capable of absorbing a certain data volume that can be transmitted later to the central station.

Processing unit (2, 7) in each acquisition unit preferably comprises means for storing (in working memory $M_3$ for example) series of coefficients defining a certain number of intermediate precalculated filters $F_1$ to $F_N$ and metering means C for determining precisely the time interval D=int (D)+d between the time when sampling of the signals produced by the seismic receivers has started by order of the local clock and the precise time of arrival of the reference signal. This time interval takes account of the time of emission of the signal by the seismic source (TB) and also of the effective time of propagation of this signal to the acquisition unit concerned, through the transmission channel (cable or radio link) connecting it to central station CS, which may vary on account of its position in the field.

This time interval D being measured, signal processor 7 is programmed to a) renumber the samples taken before the reference time according to the value of int(D), as described above, b) calculate the coefficients of the fractional digital filter suited to compensate for the measured difference, and c) apply the suitable delay filter.

The coefficients of the suitable digital filter are preferably calculated as mentioned above by interpolation between the series of coefficients of the N precalculated filters $F_1$ to $F_N$ that bound the fraction d of time interval D, stored in memories M of processing unit 2, 7.

The extremely precise readjustment that is performed between the signal emitted by the or each seismic source allows to improve the processing results such as "trace" stacking or correlations that are performed by each acquisition device in the field prior to repatriation of the seismic data to the central station.

The method is particularly advantageous in cases where, for example, seismic operations are carried out with vibrators working simultaneously or with a time lag in relation to one another. Acquisition of the seismic signals is then performed continuously. The correlation that is conventionally carried out between each vibrational signal and the acquired signals first requires resynchronization thereof so as to take account of the time lags in relation to the various TB. This operation is performed without any difficulty considering the software means selected to do this.

When using for example four sets of sweep-frequency vibrators with a sweep time of 16 s, an acquisition window or listening period of 6 s and a displacement time interval of 30 s, a mean slip time of (16+6+30)/4=13 s is determined. The signals intended to be correlated must first be readjusted by using the beginning of each period of time equal to this slip time as the reference. The processing unit of each acquisition device is readily adaptable in order to carry out the desired adjustments with the signals of the various vibrators.

What is claimed is:

1. A method intended for synchronized acquisition of seismic signals by at least one acquisition unit comprising an analog-to-digital converter, allowing to obtain a series y[n] of samples of each signal readjusted from at least one reference time ($t_R$) on, from a first series x[n] of digitized samples of this seismic signal, produced from any initial time ($t_0$) prior to the reference time by said converter with a definite sampling interval ($\Delta t$), characterized in that it comprises:

detecting a synchronization signal indicative of this reference time ($t_R$), measuring the effective time difference (D) between reference time ($t_R$) and initial time ($t_0$), calculating coefficients of a fractional digital filter (F) suited to compensate for the measured effective time difference, the coefficients being sufficient in number to obtain a fixed time compensation precision, and applying the fractional digital compensation filter to the first series of samples, which allows to obtain a series of digitized samples readjusted from reference time ($t_R$).

2. A method as claimed in claim 1, characterized in that calculation of the fractional filter coefficients comprises determining ripple margins ($\Delta D, a$) of the amplitude and of the phase respectively according to the maximum time error ($E_M$) affecting the signal delayed by the filter by applying the relation:

$$E_M \approx \sqrt{[(\Delta D)^2 + (\alpha)^2]}.$$

3. A method as claimed in claim 1, characterized in that:

the values of the coefficients of N intermediate digital filters ($F_1$ to $F_N$) suited to compensate for N time difference values spread over the duration of sampling interval ($\Delta t$) of the seismic signal by the analog-to-digital converter are first determined, and these filtering coefficients are stored, the coefficients of the fractional digital filter suited to compensate for measured effective time difference (D) are calculated by interpolation between the coefficients of the series of filtering coefficients associated with the closest difference values, and the fractional compensation filter is applied to the first series of samples.

4. A method as claimed in claim 1, characterized in that the coefficients of the digital filter suited to compensate for the measured effective time difference are calculated by means of a Lagrange interpolation.

5. A method as claimed in claim 1, characterized in that the synchronization signal is generated upon detection of a seismic signal.

6. A method as claim ed in claim 5, characterized in that the seismic signal is emitted by at least one seismic source coupled with the ground.

7. A method as claimed in claim 6, characterized in that the seismic signal is emitted by at least one seismic vibrator.

8. A method intended for acquisition of seismic signals picked up by seismic receivers (R) in contact with the ground and connected to at least one seismic acquisition unit (A) at a distance from a control station, in response to elastic waves emitted in the ground at reference times by emission means, characterized in that it comprises:

acquisition, with a definite sampling interval, of at least one series of digitized samples of each of these seismic signals by an analog-to-digital converter (AD) in each acquisition unit (A), from an initial time ($t_0$) prior to the reference time, detection, by each acquisition unit, of a synchronization signal indicative of reference time ($t_R$), measurement of the effective time difference (D) between the initial time and reference time ($t_R$), determination of the coefficients of a fractional digital filter (F) suited to compensate for the measured effective time difference, the coefficients being sufficient in number to obtain a fixed compensation precision, and application of compensation filter (F) to the first series of samples, allowing to form a series of digitized samples readjusted from said reference time ($t_R$).

9. A method as claimed in claim 7, characterized in that each synchronization signal is emitted by the control station in response to triggering of emission means, and the effective time difference (D) between the initial time and the reference time is measured by taking account of the time of propagation of the synchronization signal on a transmission channel (4, TC) connecting each acquisition unit (A) to control station (CS).

10. A method as claimed in claim 7, wherein the elastic waves are emitted by several vibrators, characterized in that it comprises:

detection, by each acquisition unit (A), of synchronization signals emitted in response to emission of waves by each vibrator, and measurement of said effective time differences (D), determination of the coefficients of the various fractional digital filters (F) suited to compensate for the various measured effective time differences, the coefficients being sufficient in number to obtain a fixed compensation precision, and application of the various compensation filters (F) allowing to form series of digitized samples readjusted from said reference time ($t_R$).

11. A method as claimed in claim 1, characterized in that it comprises combination, with the seismic signals, of the various seismic signals acquired and readjusted.

12. A synchronized seismic signal acquisition device suited to produce, from each seismic signal, at least one series of digitized samples readjusted from a reference time ($t_R$) on, from a first series of digitized samples of these seismic signals produced from at least one initial time ($t_0$) prior to reference time ($t_R$), comprising at least one acquisition unit (A) including an analog-to-digital converter (AD) producing said first series of samples, characterized in that it comprises, in each acquisition unit (A), a means (3) for detecting a synchronization signal, a processing unit (2, 7) associated with means ($M_1$–$M_3$) for storing series of samples produced by said converter (AD), a metering means (C) for measuring the effective time interval elapsed between the initial time and the reference time, processing unit (2, 7) being programmed to determine coefficients of a fractional digital filter suited to compensate for the measured effective time difference, and to apply the fractional digital compensation filter to the first series of samples.

13. An acquisition device as claimed in claim 12, wherein each seismic signal is picked up by a seismic receiver (R) in contact with the ground, each acquisition unit (A) including means (RE, RR) allowing data exchange through a transmission channel (4, TC) with a distant station (CS) provided with a means for emitting the synchronization signal in response to detection of an event, and a control system including the processing unit, suited to process the seismic data before they are transmitted to the central station, characterized in that processing unit (2, 7) is programmed to determine coefficients of a fractional digital filter suited to compensate for the effective time difference measured by metering means (C), by taking account of the effective time of propagation of the synchronization signal on said transmission channel connecting each acquisition unit (A) to central station (CS).

14. A device as claimed in claim 12, characterized in that it comprises storage means for coefficients of N intermediate digital filters ($F_1$ to $F_N$) suited to compensate for N time difference values spread over the duration of the seismic signal sampling interval by said converter, the processing unit being suited to calculate the coefficients of the fractional digital filter suited to compensate for the measured effective time difference, by interpolation between the coefficients of the series of filtering coefficients associated with the closest difference values, and to apply the fractional compensation filter to the first series of samples.

15. A device as claimed in claim 12, for synchronized acquisition of seismic signals, in response to emission in the ground of elastic waves by several (F) vibrators, characterized in that it comprises metering means in each acquisition unit (A) for detecting synchronization signals emitted in response to the emission of waves by each vibrator, and for measuring each effective time difference (D), the processing unit comprising means for determining the coefficients of the various fractional digital filters suited to compensate for the measured effective time differences, and means for applying the various compensation filters (F) allowing to form a series of digitized samples readjusted from said reference time ($t_R$).

16. A device as claimed in claim 12, characterized in that it comprises, in each acquisition unit, means for combining the emitted signals and the readjusted signals.

17. A method as claimed in claim 2, characterized in that:

the values of the coefficients of N intermediate digital filters ($F_1$ to $F_N$) suited to compensate for N time difference values spread over the duration of sampling interval ($\Delta t$) of the seismic signal by the analog-to-digital converter are first determined, and these filtering coefficients are stored, the coefficients of the fractional digital filter suited to compensate for measured effective time different (D) are calculated by interpolation between the coefficients of the series of filtering coefficients associated with the closest difference values, and the fractional compensation filter is applied to the first series of samples.

18. A method as claimed in claim 2, characterized in that the coefficients of the digital filter suited to compensate for the measured effective time difference are calculated by means of a Lagrange interpolation.

19. A method as claimed in claim 3, characterized in that the coefficients of the digital filter suited to compensate for the measured effective time difference are calculated by means of a Lagrange interpolation.

20. A method as claimed in claim 2, characterized in that the synchronization signal is generated upon detection of a seismic signal.

21. A method as claimed in claim 3, characterized in that the synchronization signal is generated upon detection of a seismic signal.

22. A method as claimed in claim 4, characterized in that the synchronization signal is generated upon detection of a seismic signal.

23. A method as claimed in claim 8, wherein the elastic waves are emitted by several vibrators, characterized in that it comprises:

- detection, by each acquisition unit (A), of synchronization signals emitted in response to emission of waves by each vibrator, and measurement of said effective time differences (D),
- determination of the coefficients of the various fractional digital filters (F) suited to compensate for the various measured effective time differences, the coefficients being sufficient in number to obtain a fixed compensation precision, and
- application of the various compensation filters (F) allowing to form series of digitized samples readjusted from said reference time ($t_R$).

24. A device as claimed in claim 13, characterized in that it comprises storage means for coefficients of N intermediate digital filters ($F_1$ to $F_N$) suited to compensate for N time difference values spread over the duration of the seismic signal sampling interval by said converter, the processing unit being suited to calculate the coefficients of the fractional digital filter suited to compensate for the measured effective time difference, by interpolation between the coefficients of the series of filtering coefficients associated with the closest difference values, and to apply the fractional compensation filter to the first series of samples.

25. A device as claimed in claim 13, for synchronized acquisition of seismic signals, in response to emission in the ground of elastic waves by several vibrators, characterized in that it comprises metering means in each acquisition unit (A) for detecting synchronization signals emitted in response to the emission of waves by each vibrator, and for measuring each effective time difference (D), the processing unit comprising means for determining the coefficients of the various fractional digital filters (F) suited to compensate for the measured effective time differences, and means for applying the various compensation filters (F) allowing to form a series of digitized samples readjusted from said reference time ($t_R$).

26. A device as claimed in claim 14, for synchronized acquisition of seismic signals, in response to emission in the ground of elastic waves by several vibrators, characterized in that it comprises metering means in each acquisition unit (A) for detecting synchronization signals emitted in response to the emission of waves by each vibrator, and for measuring each effective time difference (D), the processing unit comprising means for determining the coefficients of the various fractional digital filters (F) suited to compensate for the measured effective time differences, and means for applying the various compensation filters (F) allowing to form a series of digitized samples readjusted from said reference time ($t_R$).

27. A device as claimed in claim 13, characterized in that it comprises, in each acquisition unit, means for combining the emitted signals and the readjusted signals.

28. A device as claimed in claim 14, characterized in that it comprises, in each acquisition unit, means for combining the emitted signals and the readjusted signals.

29. A device as claimed in claim 15, characterized in that it comprises, in each acquisition unit, means for combining the emitted signals and the readjusted signals.

* * * * *